United States Patent
Yasuda

(10) Patent No.: US 12,437,360 B2
(45) Date of Patent: Oct. 7, 2025

(54) IMAGE PROCESSING METHOD AND RECORDING MEDIUM FOR DILATING AN OBJECT IN A RUN-LENGTH ENCODED BINARY IMAGE

(71) Applicant: SCREEN HOLDINGS CO., LTD., Kyoto (JP)

(72) Inventor: Takuya Yasuda, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 409 days.

(21) Appl. No.: 18/157,943

(22) Filed: Jan. 23, 2023

(65) Prior Publication Data

US 2023/0237615 A1 Jul. 27, 2023

(30) Foreign Application Priority Data

Jan. 26, 2022 (JP) ................................ 2022-009990

(51) Int. Cl.
*G06T 3/40* (2024.01)

(52) U.S. Cl.
CPC ...................... *G06T 3/40* (2013.01)

(58) Field of Classification Search
None
See application file for complete search history.

(56) References Cited

U.S. PATENT DOCUMENTS

| | | | | |
|---|---|---|---|---|
| 5,586,058 A | * | 12/1996 | Aloni | ...................... G06T 7/001 |
| | | | | 382/148 |
| 5,619,429 A | * | 4/1997 | Aloni | ............... G01N 21/95607 |
| | | | | 382/148 |
| 5,889,881 A | * | 3/1999 | MacAulay | ......... G01N 33/5017 |
| | | | | 382/199 |

(Continued)

FOREIGN PATENT DOCUMENTS

| | | |
|---|---|---|
| JP | 06-217110 A | 8/1994 |
| JP | 07-203178 A | 8/1995 |
| JP | 2016-014975 A | 1/2016 |

OTHER PUBLICATIONS

G. Ehrensperger et al., "Fast algorithms for morphological operations using run-length encoded binary images," arXiv: 1504.01052v1 [cs.CV] Apr. 4, 2015 (Year: 2015).*

(Continued)

*Primary Examiner* — Soo Shin
(74) *Attorney, Agent, or Firm* — Rimon P.C.

(57) ABSTRACT

An image processing method according to the invention is for dilating an object in a binary image represented by run-length code. The image processing method includes obtaining a target dilation amount representing how much the object is to be dilated, determining a first dilation amount decreasing as a density of runs in the image increases, comparing the target dilation amount and the first dilation amount, and performing an dilation processing based on the comparison result. If the target dilation amount is larger than the first dilation amount, a first dilation processing by the (Continued)

first dilation amount and a second dilation processing after the first dilation processing by a second dilation amount are performed. The second dilation amount is a difference between the target dilation amount and the first dilation amount. Otherwise, the dilation processing by the target dilation amount is directly performed.

9 Claims, 7 Drawing Sheets

(56) References Cited

U.S. PATENT DOCUMENTS

| | | | | |
|---|---|---|---|---|
| 6,026,174 | A | * | 2/2000 | Palcic ................ G01N 33/5017 382/128 |
| 2011/0249300 | A1 | * | 10/2011 | Nakagata .................. G06T 5/30 358/3.26 |

OTHER PUBLICATIONS

Simge Yucel, "Rule Based Segmentation of Colon Glands," Thesis, Bilkent University, Sep. 2018 (Year: 2018).*

Ehrensperger Ehrensperger Gregor Gregor et al., "Fast algorithins for morphological operations using run-length encoded binary images", Apr. 4, 2015.

Zhang Jun-Song et al., "Denoising of Chinese calligraphy tablet images based on run-length statistics and structure characteristic of character strokes", Journal of Zhejiang University Science A, Zheijiang University Press, CN, vol. 7, No. 7, Jul. 1, 2006, pp. 1178-1186.

Thomas M. Breuel, "Binary Morphology and Related Operations on Run-Length Representations 108 ", Proceedings of the Third International Conference on Computer Vision Theory and Applications; Funchal, Madeira, Portugal; Jan. 22-25, 2008, Jan. 1, 2008, pp. 159-166.

Extended European Search Report issued in corresponding European Patent Application No. 23151362.3-1210, dated Jun. 21, 2023.

* cited by examiner

F I G. 1
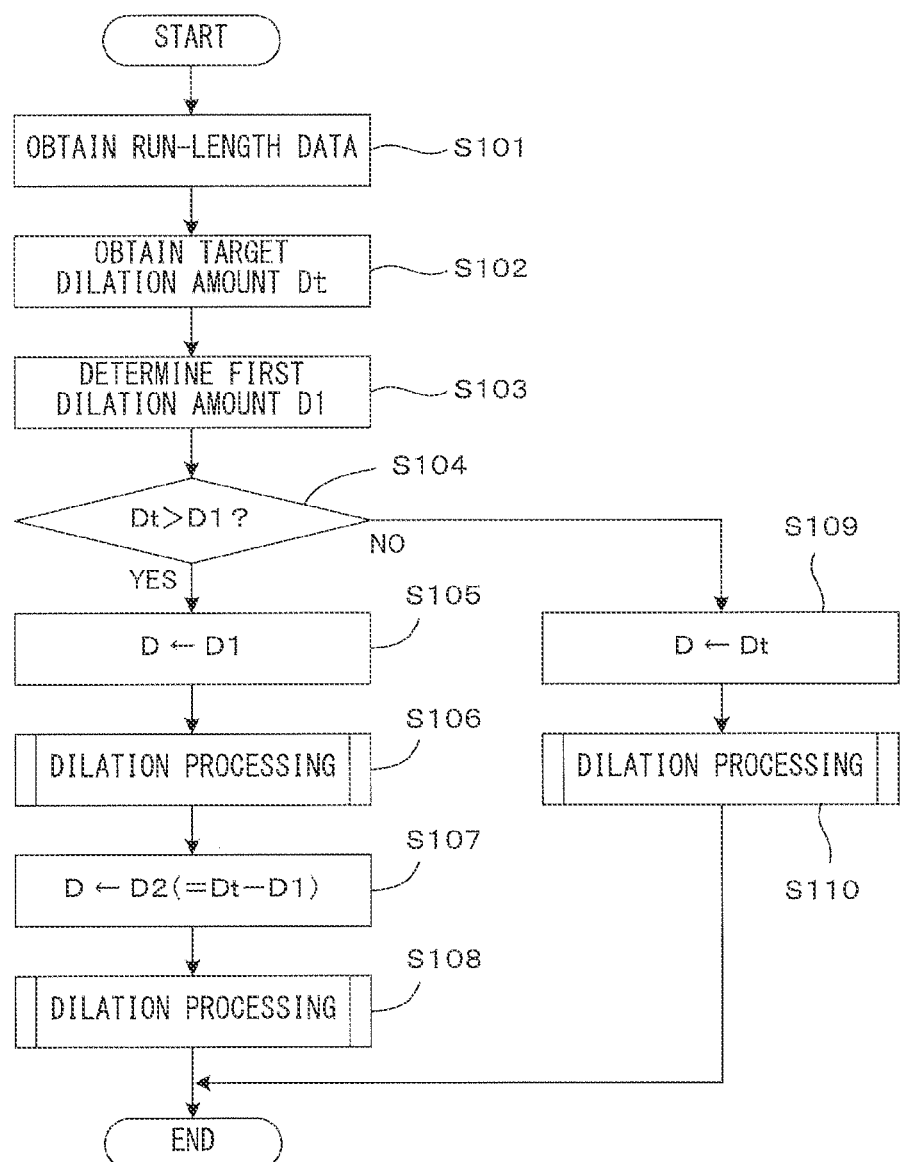

×

RUN DATA: (3,4,4)

RUN DATA: (2,5,2),(1,6,3),(1,6,4), (1,6,5),(2,5,6)

×

BITMAP:

RUN DATA:

BITMAP   RUN DATA

Y=2:   (7,8,2)

(5,10,2)

(6,9,0),(5,10,1),(5,10,2),(5,10,3),(6,9,4)

Y=3:   (9,9,3)

(7,11,3)

(8,10,1),(7,11,2),(7,11,3),(7,11,4),(8,10,5)

Y=4:   (3,4,4),(9,9,4)

(1,6,4),(7,11,4)→(1,11,4)

(2,5,2),(8,10,2),
(1,6,3),(7,11,3)→(1,11,3),
(1,6,4),(7,11,4)→(1,11,4),
(1,6,5),(7,11,5)→(1,11,5),
(2,5,6),(8,10,6)

Y=5:   (3,3,5),(9,10,5)

(1,5,5),(7,12,5)

(2,4,3),(8,4,3),(1,5,4),(7,6,4),(1,5,5),(7,6,5),
(1,5,6),(7,6,6),(2,4,7),(8,4,7)

IMAGE PROCESSING METHOD AND RECORDING MEDIUM FOR DILATING AN OBJECT IN A RUN-LENGTH ENCODED BINARY IMAGE

CROSS REFERENCE TO RELATED APPLICATION

The disclosure of Japanese Patent Application No. 2022-009990 filed on Jan. 26, 2022 including specification, drawings and claims is incorporated herein by reference in its entirety.

BACKGROUND OF THE INVENTION

1. Field of the Invention

This invention relates to an image processing for dilating an object in a binary image, particularly to a processing using run-length represented image data.

2. Description of the Related Art

A binary image obtained by binarizing an image using a predetermined threshold value may be used for the purpose of inspecting defects in industrial products such as various substrates including semiconductor substrates and printed circuit boards and extracting a specific structure (e.g. cell nucleus) from a tissue specimen image. In such a binary image, since white pixels or black pixels tend to continuously appear, data compression by run-length encoding is effective. Such data compression contributes to the speed-up of a data processing using this data in addition to the saving of memory resources for data storage. This is because it is possible to suppress a reduction in processing speed caused by large image data occupying a memory and shorten a time required for data transfer.

JP 2016-014975A (patent literature 1) discloses an image processing technique suitable for such a data processing. In this conventional technique, a plurality of run data are processed in parallel by a data calculation unit including a plurality of processor cores, whereby a processing is speeded-up.

A dilation processing of dilating an object in an image by a predetermined amount is, for example, known as an image processing for a binary image as described above. The apparatus described in patent literature 1 is applicable also to such an image processing. Further, a conventional technique referring to the execution of a dilation processing without decoding using run-length encoded binary image data is described in JP H06-217110A (patent literature 2) and JP H07-203178A (patent literature 3).

In run-length encoding, since the continuity of pixels in one coordinate direction is eminently represented, it is relatively easy to dilate an object in this direction. On the other hand, the continuity of pixels in a coordinate direction intersecting the one coordinate direction is not directly represented. Accordingly, to perform the dilation processing while evaluating the continuity, coordinate positions occupied by respective runs at proximate positions in the latter direction need to be compared and verified with each other. Thus, if a dilation amount of the object is large or many runs are discretely distributed in an image, a long time is unavoidably required for the processing.

From this, a technique capable of performing a dilation processing at a high speed using run-length data is required for images in which a dilation amount of an object is large or many runs are discretely distributed. However, such a technique has not been established yet.

SUMMARY OF THE INVENTION

This invention was developed in view of the above problem and aims to provide a technique capable of performing a dilation processing of an object in a run-length represented binary image at a high speed even if a dilation amount of the object is large or many runs are discretely distributed in the image.

One aspect of the invention is directed to an image processing method for dilating an object in a binary image represented by run-length code, the image processing method including obtaining a target dilation amount representing how much the object is to be expanded, determining a first dilation amount which has a smaller value as a density of runs in the binary image increases, comparing the target dilation amount and the first dilation amount and performing an dilation processing based on a result of the comparison.

Here, if the target dilation amount is larger than the first dilation amount, a first dilation processing of dilating the object by the first dilation amount and a second dilation processing of dilating the object after the first dilation processing by a second dilation amount, which is a difference between the target dilation amount and the first dilation amount, are performed as the dilation processing. On the other hand, if the target dilation amount is equal to or smaller than the first dilation amount, the dilation processing of directly dilating the object by the target dilation amount is performed.

In the invention thus configured, the dilation processing of the object is performed using image data of the run-length represented binary image. If the target dilation amount of the object is larger than the first dilation amount determined according to the run density in the image, the dilation processing of the object is performed in two stages. That is, the object is first dilated using the first dilation amount and, thereafter, the object is dilated using the second dilation amount, which is a difference between the target dilation amount and the first dilation amount.

The knowledge of the inventors of this application on such a data processing is as follows. If the target dilation amount is large, more specifically, if many other runs are included in a range in which one run is dilated by the dilation processing for the run data, a time is required for a processing of evaluating continuity with the other runs for each dilated run. That is, the runs separated from each other may be connected and integrated by dilation. In that case, the individual run data need to be integrated into one. To determine the presence or absence of such connection, coordinate positions occupied by the respective runs need to be compared to each other. A calculation amount for that dramatically increases if there are many other runs in the dilation range.

Each run is dilated using the relatively small first dilation amount (first dilation processing) as a first stage of the dilation processing. Then, since the number of the other runs included in the dilation range is reduced, the above calculation amount can also be relatively small. At this time, the first dilation amount is desirably set to integrate as many runs discretely distributed along an extending direction of the run as possible. By integrating a plurality of the runs in the first stage in this way, the number of the runs in the image after the dilation can be largely reduced. For this purpose, the first dilation amount is determined according to the density of the runs in the image. That is, the higher the density of the runs in the image, the smaller the first dilation amount.

When the dilation processing is performed using the second dilation amount (second dilation processing) in a subsequent second stage, the number of the runs in the image is already largely reduced. Accordingly, the number of combinations of the runs, for which the presence or absence of the above connection is determined, is also considerably reduced. Thus, a large increase of the calculation amount is avoided. Further, since the second dilation amount is the difference between the target dilation amount and the first dilation amount, each object is finally dilated by the target dilation amount after the second processing.

Accordingly, the dilation processing can be performed at a high speed by suppressing an increase of the calculation amount even if the target dilation amount is large or the run density is high while the purpose of dilating the object by the target dilation amount is achieved.

As described above, according to the invention, the dilation processing is performed separately in two stages if the target dilation amount is large for the run density in the image. Thus, the dilation processing can be performed at a high speed by suppressing an increase of the calculation amount even if the target dilation amount is large or the runs are scattered in the image.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 1 is a flow chart showing the image processing according to the invention.

FIG. 5 is a diagram showing the dilation processing for each target line.

DETAILED DESCRIPTION OF THE PREFERRED EMBODIMENTS

Figure 2A:
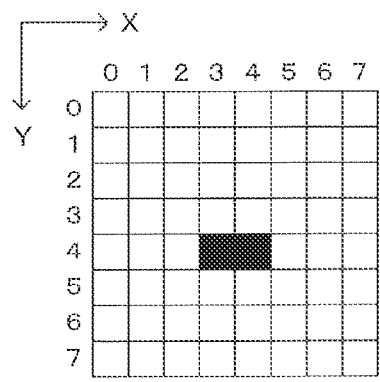
FIGS. 2A and 2B are diagrams schematically showing changes of image data by the dilation processing.
Figure 2A:
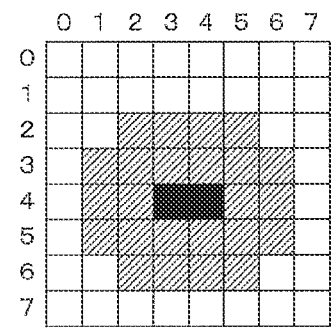

Hereinafter, one embodiment of an image processing method according to the invention is described. An image processing of this embodiment includes a dilation processing of dilating an object in a run-length represented binary image by a predetermined target dilation amount. A data calculation apparatus having an appropriate hardware configuration such as a personal computer device can be, for example, used as an execution body of the image processing. For example, the data calculation apparatus described in patent literature 1 can be suitably applied. Here, the apparatus configuration is not described, assuming that a data calculation apparatus similar to the one described in patent literature 1 is used as an execution body.

This image processing is realized by a CPU provided in the data calculation apparatus executing a control program prepared in advance. First, an outline flow of this image processing is described with reference to FIG. 1.

FIG. 1 is a flow chart showing the image processing according to the invention. First, image data of a binary image to be processed is obtained (Step S101). This image data is obtained by reversibly compressing the data of the binary image with the run-length encoding. An image obtained by binarizing a defect image of an industrial product, a microscope image of a tissue specimen or cultured cell or the like can be, for example, used as the binary image, but there is no limitation to this.

Various run-length encoding methods have been proposed, and there is no particular limitation. The run-length encoding method having a starting point coordinate and an end point coordinate of each run in a coordinate axis along an extending direction of the runs as information is preferable as the run-length encoding method particularly suitable for the dilation processing of this embodiment. It is more preferable to also have information on coordinate positions of the runs in a coordinate axis intersecting the extending direction of the runs. An encoding method described in patent literature 3 can be, for example, applied as such an encoding method.

It is assumed below that run-length data encoded by the encoding method described in patent literature 3 is used. Other methods, e.g. an encoding method for representing each run by a starting point coordinate and a length thereof, are technically equivalent as long as these methods and the method of patent literature 3 can be reversibly converted to each other. The run-length encoding method in a narrow sense performs encoding by successively arranging the consecutive same values in a data string. On the other hand, run-length data in this embodiment has starting point coordinates and end point coordinates of the runs as information. Such an encoding method also uses a concept of the run-length encoding method in that encoding is performed by aggregating data strings in which the values continue. A term "run-length represented" may be used for run-length data in a broad sense encoded using such a concept of the run-length encoding method in this specification. Further, the run-length represented data is merely referred to as "run data" below.

Subsequently, a target dilation amount Dt representing how much each object in the image is to be finally dilated is obtained (Step S102). For example, the target dilation amount Dt may be determined in advance by a processing recipe or a set value of the target dilation amount Dt given by an instruction input from a user may be received.

The target dilation amount represents to an object of how many pixels an isolated point is to be dilated, and can be designated, for example, using a pixel number as a unit. The target dilation amount may be isotropic to circularly dilate and the isolated point or may be set to have a different dilation amount depending on a direction.

Subsequently, a first dilation amount D1 on the dilation amount of the object is calculated based on the obtained image data (Step S103). The first dilation amount D1 is a value used to restrict the dilation amount in the first dilation processing if the target dilation amount Dt is too large in view of contents of the image. The technical significance and calculation method thereof are described in detail later.

The calculated first dilation amount D1 is compared to the target dilation amount Dt (Step S104). The following operation differs depending on the comparison result thereof. That is, if the target dilation amount Dt is larger than the first dilation amount D1 (YES in Step S104), Steps S105 to S108 are performed. On the other hand, if the target dilation amount Dt is equal to or smaller than the first dilation amount D1 (NO in Step S104), Steps S109 to S110 are performed.

In Step S105, a value of a dilation amount D used in the dilation processing is set to the first dilation amount D1 and the dilation processing is performed in Step S106. As described later, this dilation processing is a processing of dilating the object in the image by the dilation amount D. By setting the dilation amount D to the first dilation amount D1 and performing the dilation processing, each object in the image is dilated by the first dilation amount D1.

Subsequently, the dilation amount D is set to a second dilation amount D2 (Step S107) and the dilation processing is further performed (Step S108). The content of the dilation processing is the same as in Step S106, but the setting of the dilation amount D is different. The second dilation amount D2 is a value obtained by subtracting a first dilation amount D1 from the target dilation amount Dt. Since Dt>D1 in this case, the second dilation amount D2 is a positive value.

As just described, in the processings of Steps 5105 to 5108, the dilation processing is performed in two stages. That is, the dilation processing is first performed with the dilation amount D set to the first dilation amount D1 smaller than the target dilation amount Dt. In this way, the objects in the image are dilated by the first dilation amount D1. At this point of time, each object is not dilated by the target dilation amount Dt yet. Subsequently, the dilation processing is performed with the dilation amount D set to the second dilation amount D2, whereby each object is finally dilated by the target dilation amount Dt.

On the other hand, if Dt≤D1 (NO in Step S104), the dilation amount D is set to the target dilation amount Dt and the dilation processing is performed (Steps S109, S110), whereby each object is directly dilated by the target dilation amount Dt.

Figure 2B:
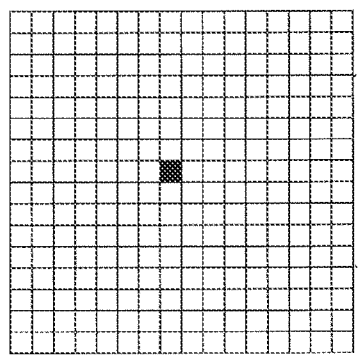
Figure 2B:
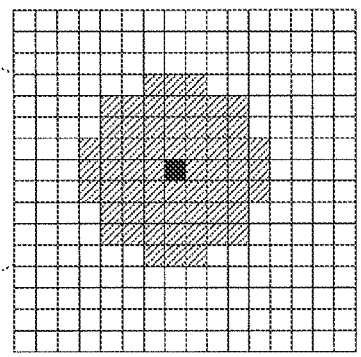

FIGS. 2A and 2B are diagrams schematically showing changes of image data by the dilation processing. A way of thinking of this dilation processing is basically the same as a dilation processing (expansion processing) described in patent literature 2. A basic way of thinking of this dilation processing is to dilate each run in a line direction (X direction) by applying an aperture corresponding to an dilation size and dilate the run in a Y direction intersecting the line direction by taking logical sums with dilation results of the other runs. Out of these, the dilation in the line direction can be realized by enlarging a length, specifically, a distance between a starting point coordinate and an end point coordinate, of each run.

However, patent literature 2 describes only a concept of replacing run data of one line with bitmap data. Accordingly, in this specification, the principle of the dilation processing is described while the dilation processing on the bitmap data and that on the run data are compared. Note that a processing of dilating an object, regarding an aggregate of black pixels using white pixels as a background as one object, is illustrated to make the figure easily visible. However, the same way of thinking is applied also in the case of handling an object composed of white pixels.

As shown in FIG. 2A, an X coordinate is defined in a lateral direction (rightward direction) of a two-dimensional image plane (bitmap) and a Y coordinate is defined in a vertical direction (downward direction), and an image plane composed of eight pixels in each of the X and Y directions is assumed. It is assumed that black pixels are arranged at two coordinate points (X, Y)=(3, 4), (4, 4) of the image plane. That is, this image includes one object composed of two pixels consecutive in the X direction.

If this object is expressed by run data in accordance with a rule that one run is indicated by one set of (X coordinate of a starting point, X coordinate of an end point, Y coordinate) by being encoded along a line extending in the X direction, this object can be expressed as (3, 4, 4). This means that one run composed of the black pixels consecutive from the position of X=3 to the position of X=4 is present at the position of Y=4. In this way, the object of FIG. 2A can be run-length represented (encoded).

In the case of performing the dilation processing of two pixels (i.e. D=2) for this object, an aperture A shown in FIG. 2A is used. The aperture A is for specifying the size of dilation of the run on a target line $L_0$ and a range of its influence. In this example, any of an aperture $A_0$ set for the target line $L_0$ and apertures $A_{-1}$, $A_{+1}$ for lines $L_{-1}$, $L_{+1}$ adjacent to the target line $L_0$ in the vertical direction is 2, and the dilation of two pixels is performed for each of these lines. Further, apertures $A_{-2}$, $A_{+2}$ set for lines $L_{-2}$, $L_{+2}$ located further outward in the vertical direction are 1, and the dilation of one pixel is performed for each of these lines.

By applying the aperture A to the image on the left side of FIG. 2A, an image obtained by dilating the run by predetermined amounts in the X and Y directions is obtained as shown on the right side of FIG. 2A. In run data, this image can be expressed by (2, 5, 2), (1, 6, 3), (1, 6, 4), (1, 6, 5), (2, 5, 6) as shown below the image. A processing of generating these data strings from the original run data (3, 4, 4) without bitmap dilation is the dilation processing on the run data.

The processing of dilating one run in the X direction may be performed only by respectively changing the starting point coordinate and the end point coordinate of this run by the pixel number designated by the aperture A in the (−X) direction and the (+X) direction. For example, by performing an operation of changing the starting point coordinate of the run data (3, 4, 4) representing the run on the target line $L_0$ from 3 to 1 and the end point coordinate thereof from 4 to 6, it is possible to obtain the run data (1, 6, 4) representing a new run by dilating this run by two pixels in each of the (±X) directions.

Further, for example, the dilation of the target line $L_0$ (Y=4) to the line $L_{-1}$ of (Y=3) one above is realized by reducing the Y coordinate in the data representing the run on the target line $L_0$ by 1 and changing the starting point coordinate and the end point coordinate by the pixel number designated by the aperture $A_{-1}$ to generate new run data. That is, the new run data (1, 6, 3) generated from the run data (3, 4, 4) before the dilation may be added to the data strings. Run data after the dilation can be similarly generated for the other lines.

Note that, to facilitate the understanding, the black pixels included in the image before the dilation processing are painted in black, whereas the pixels changing from the white pixels to the black pixels by the dilation processing are shown by hatching in FIG. 2A and subsequent figures. However, these are not distinguished and both are represented as black pixels in an actual binary image.

The aperture A differs depending on the set value of the dilation amount D. FIG. 2B shows an example of an aperture A' in the case of the dilation amount D=4. If the dilation processing is performed by applying the aperture A' to an isolated dot image on the left side of FIG. 2B, a result image on the right side of FIG. 2B is obtained. The isolated dot is dilated by four pixels in each of (±X) directions and (±Y) directions, and the contour of the object after the dilation is rounded.

As just described, the object of the original image can be dilated into various shapes by the setting of the aperture. Such various apertures can be stored and saved as a table in advance. The table can be referred to according to the setting of the dilation amount D, and the aperture corresponding to the setting can be selected. Further, not only the size of dilation, but also the shape after the dilation can be controlled by the aperture.

In an actual image, objects of various shapes and sizes are possibly included at various positions in the image. Accordingly, as a result of dilating the individual objects, a plurality of proximate objects possibly contact each other or partially overlap to form one object. Such an event also needs to be dealt with in the dilation processing of an actual image to be processed.

Figure 3:
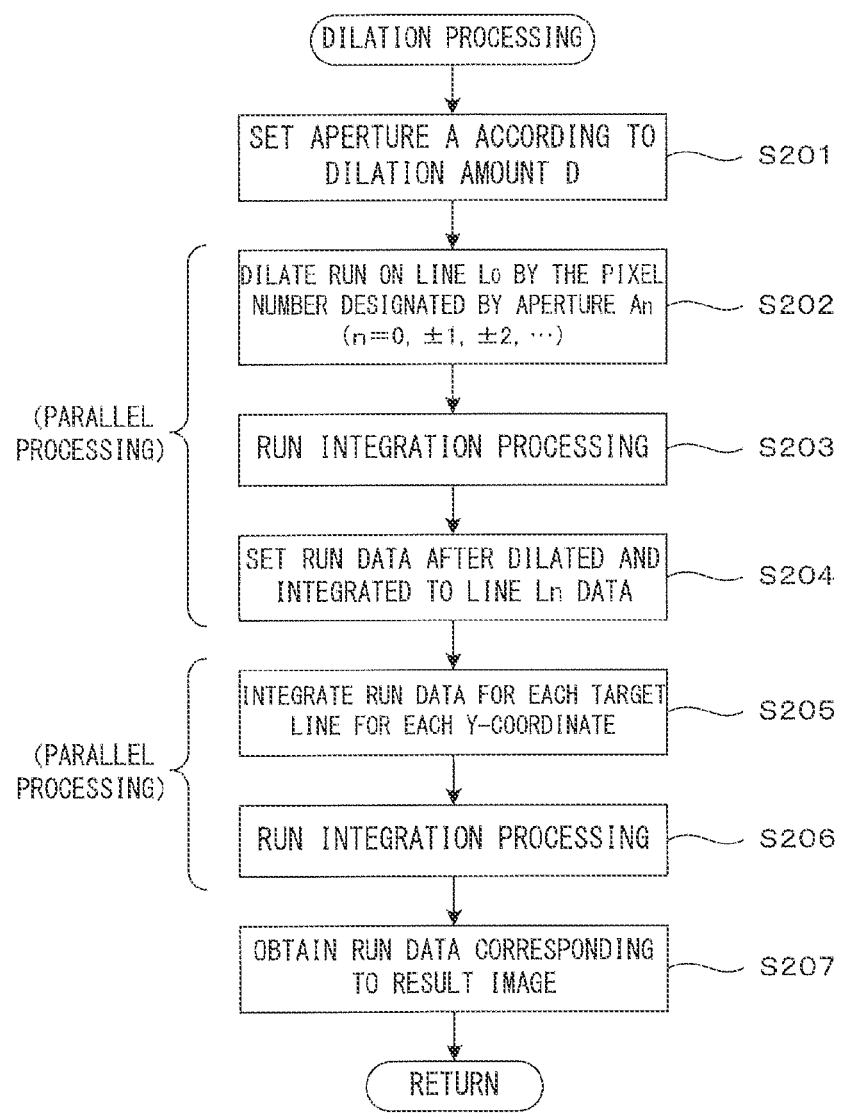
FIG. 3 is a flow chart showing the dilation processing in this embodiment.
Figure 4:
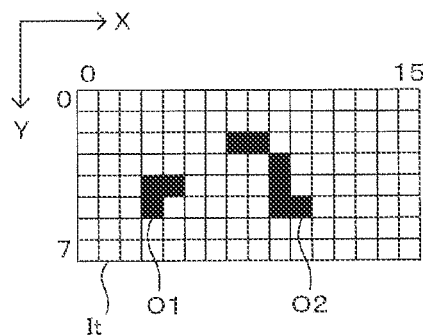
FIG. 4 is a diagram showing an example of an image as an object of the dilation processing and an image after the dilation processing.
Figure 4:
Figure 4:
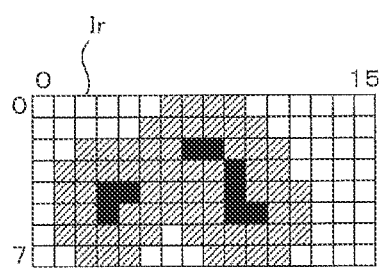
Figure 6:
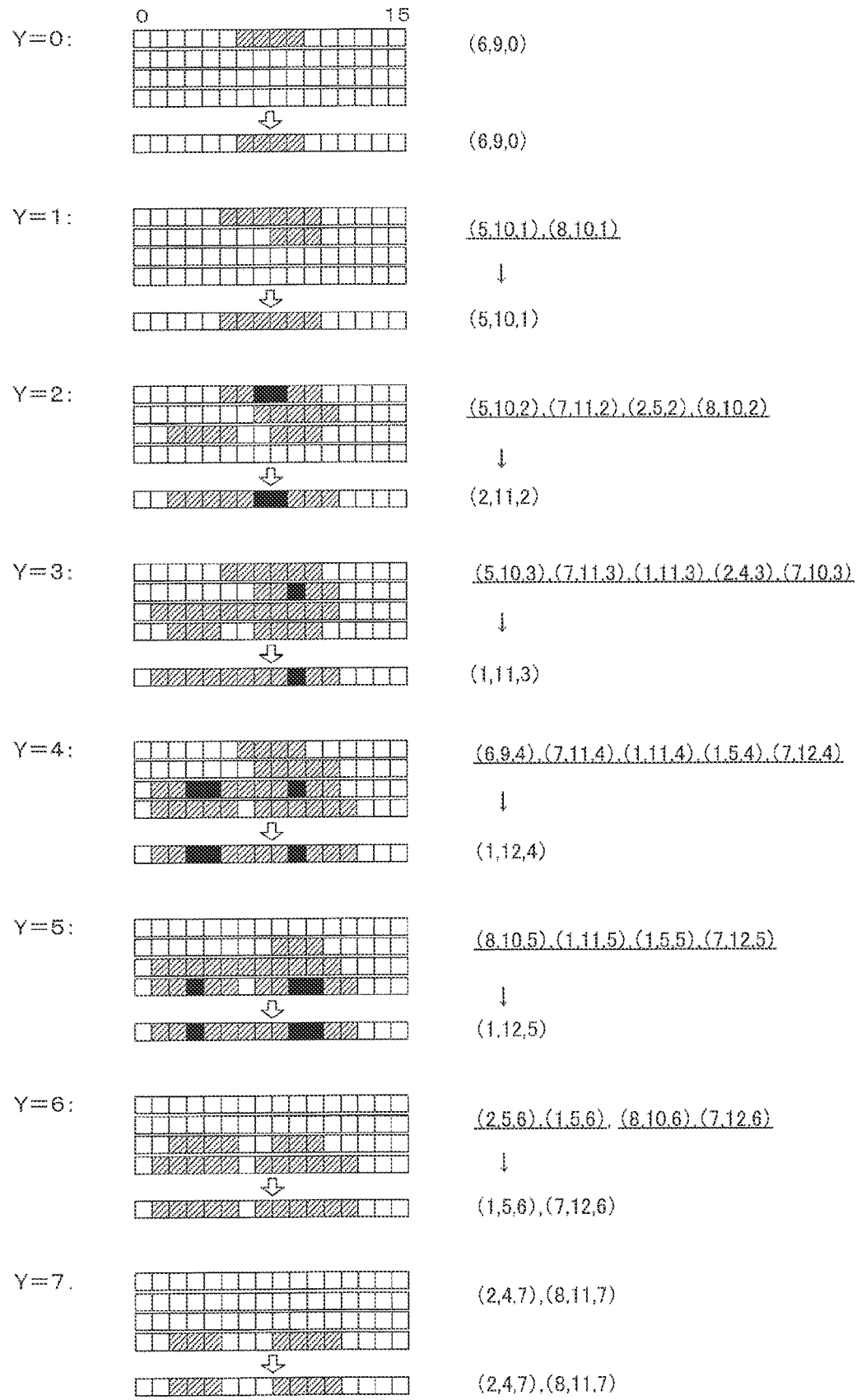
FIG. 6 is a diagram showing a processing of combining a dilation result of each target line.

FIG. 3 is a flow chart showing the dilation processing in this embodiment. Further, FIGS. 4 to 6 are diagrams schematically showing a transition of data in the dilation processing. More specifically, FIG. 4 shows an example of an image as an object of the dilation processing and an image after the dilation processing. FIG. 5 shows diagrams showing the dilation processing for each target line. Further, FIG. 6 shows diagrams showing a processing of combining a dilation result of each target line.

First, with reference to FIG. 4, a case example of a processing target image used in the following description is described. As shown in a left-upper diagram of FIG. 4, a processing target image It, which is a binary image, has a two-dimensional image plane (bitmap) composed of 16 pixels in the X direction and 8 pixels in the Y direction. In this example, two objects O1, O2 are arranged in the image plane. If this image It is represented by run data, data strings are as shown on the right-upper side of FIG. 4.

It is assumed that the dilation processing is performed for this processing target image It by using an aperture A similar to that in FIG. 2A. A result image Ir is obtained as shown in a left-lower diagram of FIG. 4 by the dilation processing to be described next. If this is represented by run data, data strings are as shown on the right-lower side of FIG. 4.

With reference to FIG. 3, specific processing contents are described. The dilation processing is started with the dilation amount D set, and the aperture A is first set according to the dilation amount D (Step S201). As described above, the table associating the dilation amount D and the aperture A corresponding thereto is, for example, prepared in advance, and the appropriate aperture A can be selected by referring to the table based on the set value of the dilation amount D. Further, the aperture A may be editable by a user operation.

Processings of following Steps S202 to S204 are individually performed for each line extending in the X direction using each line as the target line $L_0$. Thus, it is also possible to perform the processings for the respective lines in parallel by using the data calculation apparatus including a plurality of processor cores. By so doing, a time required for a calculation processing can be shortened. In other words, the dilation processing of this embodiment is suitable for a calculation apparatus having a processor configuration for performing such a parallel processing. Note that a similar result can be obtained without depending on the parallel processing by repeatedly performing the processing while successively changing the target line $L_0$. However, in this case, a processing time increases as compared to the case of the parallel processing.

This data processing may be performed using, out of the lines constituting the image, only the lines, in which runs as objects of the dilation processing are actually arranged as the target lines $L_0$. In the image It of this example, the processing may be performed for four lines of Y=2, 3, 4 and 5. FIG. 5 shows the processing for each of these lines.

In Step S202, each of the runs present on the target line $L_0$ is dilated by the pixel number designated by the aperture $A_n$ (n=0, ±1, ±2, . . . ) respectively in the (−X) direction and (+X) direction. As shown in FIG. 5, when the line of Y=2 (i.e. line $L_0$, aperture $A_0$=2) is focused, new run data (5, 10, 2) is generated from the run data (7, 8, 2) representing the run on this line by dilation by two pixels in each of the (±X) directions. The generated run data becomes data representing the run on this line after the dilation (Step S204) by way of a run integration processing (Step S203) to be described later.

Similarly, run data (6, 9, 0) becomes new run data for the line of Y=0 (i.e. line $L_{-2}$, aperture $A_{-2}$=1), run data (5, 10, 1) becomes new run data for the line of Y=1 (i.e. line $L_{-1}$, aperture $A_{-1}$=2), run data (5, 10, 3) becomes new run data for the line of Y=3 (i.e. line $L_{+1}$, aperture $A_{+1}$=2), and run data (6, 9, 4) becomes new run data for the line of Y=4 (i.e. line $L_{+2}$, aperture $A_{+2}$=1).

In this way, the processings of Steps S202 to S204 are processings of dilating only the run on the target line $L_0$ based on the aperture A without considering the presence of the runs on the other lines. Run data after the dilation can be similarly obtained also for a case where the line of Y=3 is the target line $L_0$.

On the other hand, in the processing using the lines of Y=4 or Y=5 as the target lines $L_0$, a plurality of runs are present on the target line $L_0$. For example, in the processing using the line of Y=4 as the target lines $L_0$, run data obtained by dilating each of original run data (3, 4, 4) and (9, 9, 4) by two pixels are (1, 6, 4) and (7, 11, 4). Since the starting point coordinate and the end point coordinate are adjacent in these two runs, these runs need to be coupled and handled as one run.

Thus, for a plurality of runs present on the same line, the starting point coordinates and the end point coordinates thereof after the dilation are compared to each other. In this way, whether or not the runs are in contact with or overlapping each other in the X direction is determined (hereinafter, this determination is referred to as a "contact determination"). If the runs are in contact or overlapping, data representing those as one run is generated. In this way, the plurality of runs are integrated into one. Such a processing is referred to as the "run integration processing" (Step S203) here. In FIG. 5 and FIG. 6 to be described later, sets of integrally underlined line data indicate that those can be integrated. New run data obtained by integrating those are shown on the right sides of arrows (FIG. 5) and below arrows (FIG. 6).

Note that, if the line of Y=6 is focused, this line includes a plurality of the runs. However, since those runs are sufficiently spaced apart, the runs are not in contact even after the dilation. Therefore, the runs are not integrated. This is the same for the line of Y=7.

By the processings thus far, the run(s) on the line can be dilated by a predetermined amount, focusing only on each line, without considering the continuity of the pixels in the Y direction. To perform the dilation processing taking into account the arrangement of the pixels in the Y direction, images obtained by dilating the runs for each line may be so overlapped that the Y coordinate positions coincide.

That is, the run data as a result of individual dilation for each target line (FIG. 5) is integrated for each Y coordinate position (Step S205), whereby a final result of the dilation processing can be obtained. Specifically, out of the dilation results of each target line shown in FIG. 5, the run data of the lines having the same Y coordinate position are gathered and integrated. As shown in left diagrams of FIG. 6, the processing is realized by taking a logical sum of the lines on the bitmap. However, the processing can be performed as follows on the run data.

Out of the run data after the dilation of each target line shown in FIG. 5, the run data having the same Y coordinate value are gathered. Similarly to the run integration processing (Step S203) in the X direction, the starting point coordinates and the end point coordinates of those are compared to each other, and a plurality of the runs at least partially in contact or overlapping are integrated into one (Step S206). It is possible to perform the parallel processing at each Y coordinate position also for Steps S205 to S206.

The run data integrated at each Y coordinate value in this way becomes a constituent element of the run data representing the final image after the dilation processing. That is, the run data corresponding to the final result image is obtained by generating the run data including all the run data of each Y coordinate value (Step S207). In this way, the dilation processing is realized on the run data. In this way, the result image Ir in the lower diagram of FIG. 4 is obtained.

Although the processing at each target line (Steps S202 to S204) and the processing at each Y coordinate (Steps S205 to S206) are separately performed in two stages in the above embodiment, this is a processing with importance placed on parallelism. Instead of this, a processing may be such that the combination of the peripheral lines in the X direction and the processing at each Y coordinate are collectively performed. By so doing, the amount of data to be temporarily stored in a memory for the processing can be drastically reduced.

In a series of the dilation processings described above, it is necessary to make a contact determination between the plurality of runs included in the image and integrate the runs if necessary. A calculation processing amount for this increases as the number of the other runs included in a dilation range increases when one run is dilated. Therefore, such as when the designated target dilation amount Dt is large and many other runs are included in the dilation range, when many runs are scattered in the image and when the image size itself is large, the calculation processing amount for the run integration processing may become enormous.

Figure 7A:
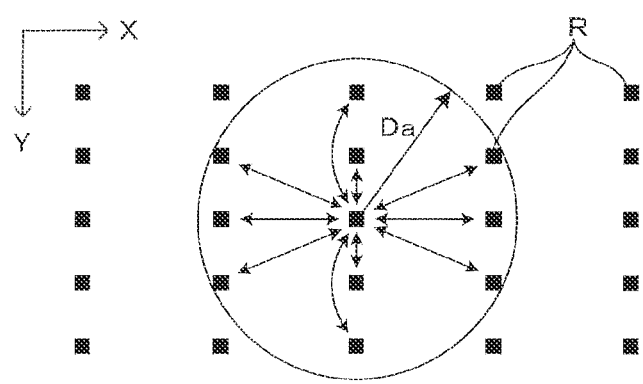
FIGS. 7A and 7B are diagrams schematically showing a relationship of a run distribution and a dilation amount.
Figure 7B:
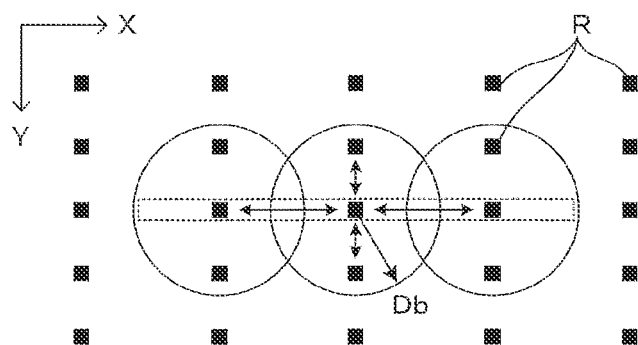

FIGS. 7A and 7B are diagrams schematically showing a relationship of a run distribution and a dilation amount. A case is considered where a dilation amount Da is set to be relatively large with many runs R discretely distributed as shown in FIG. 7A. Then, since many other runs are included in an dilation range of one run, the number of the runs, for which the contact determination is made, also increases as indicated by arrows. This leads to the lengthening of a processing time.

The same holds true also for a case where many runs are scattered at relatively small intervals and at a high density even if the dilation amount is not very large. That is, this problem depends on a relationship of the size of the target dilation amount and a condition of run distribution.

On the other hand, the calculation processing amount for the contact determination can be largely reduced in some cases by properly setting the dilation amount for the run density. For example, when a dilation amount Db is comparable with intervals between runs R as shown in FIG. 7B, the number of the other runs included in an dilation range of one run is reduced and the calculation processing amount for the contact determination can also be suppressed.

Using this, it is possible to shorten the processing time even if the dilation amount is large for the run density. That is, even if the large dilation amount is necessary as shown in FIG. 7A, it is possible to use a two-stage dilation processing by first performing a dilation processing using an appropriate dilation amount as shown in FIG. 7B and, thereafter, performing an dilation processing for realizing the final dilation amount.

By suppressing the dilation amount in a first stage, the calculation processing amount can be reduced. On the other hand, since the additional dilation processing is necessary thereafter, there is a concern that the processing time becomes longer. However, by integrating a plurality of the runs by the dilation processing in the first stage using the appropriately determined dilation amount Db as shown by dotted lines in FIG. 7B, the number of the runs when the dilation processing is performed in a second stage is expected to be largely reduced. Then, the calculation processing amount for the contact determination can be suppressed also in the second stage. As a result, by dividing the dilation processing into two stages, it is possible to shorten the processing time as a whole and speed up the processing.

Whether or not such a two-stage dilation processing is effective is thought to mainly depend on the size of the dilation amount and the run density. That is, the larger the dilation amount and the higher the run density, the number of the other runs, for which the contact determination is made, increases, with the result that the processing takes time.

Accordingly, in this embodiment, if run data of a binary image to be processed is given, such a threshold value that becomes smaller as the run density increases is calculated for the target dilation amount Dt based on the run data. The subsequent processing changes depending on whether or not the target dilation amount Dt is larger than that threshold value. The threshold value for this is the first dilation amount D1 described above.

If the target dilation amount Dt is larger than the first dilation amount D1, the two-stage dilation processing is introduced to suppress a reduction in processing speed due to many runs, for which the contact determination is made. That is, the first dilation processing is first performed using the first dilation amount D1. Thereafter, the second dilation processing is performed using the second dilation amount D2 (=Dt−D1), which is a shortfall of the dilation amount.

On the other hand, if the target dilation amount Dt is equal to or smaller than the first dilation amount D1, the dilation processing is realized at one time using the target dilation amount Dt since there is no advantage of adopting the two-stage dilation processing.

As shown in FIG. 7B, the first dilation amount D1 is selected to reduce the number of the runs on the same line as much as possible, preferably integrate all the runs by performing the dilation processing using this dilation amount. However, as long as this condition is satisfied, the first dilation amount D1 is preferably a small value. By so doing, the number of the runs in the image can be largely reduced by the dilation processing in the first stage and the calculation processing amount of the contact determination in the dilation processing in the second stage can be suppressed.

Contents of images to be processed vary, and there are not necessarily many cases where runs are regularly arranged as shown in FIG. 7A. Thus, it is, in principle, impossible to uniquely obtain such a first dilation amount D1 capable of reliably integrating all of a plurality of runs on the same line. Thus, a calculation formula for obtaining the first dilation amount D1 needs to be empirically determined to a certain extent so that an effect of shortening the processing time is obtained in many cases where the two-stage dilation processing is adopted.

In principle, an optimal value of the first dilation amount D1 depends on image contents, specifically the run density in the image. Accordingly, the first dilation amount D1 is desirably set according to the image contents, rather than being a fixed value. The run density can be easily estimated, for example, from an image size (a total number of pixels) and the number of the runs in the image.

According to the knowledge of the inventors of this application, it is considered to express the first dilation amount D1, for example, by the following equation:

$$D1 = \alpha (W \cdot H/N)^{1/2}/2 \qquad \text{(Equation 1)}.$$

Here, W denotes a width of the image, H denotes a height of the image, and these width and height can be expressed, for example, by pixel numbers. Accordingly, a product W·H represents the size (area) of the image by a pixel number. Further, N denotes the number of the runs in the image, and an inverse of the run density, i.e. a value equivalent to a run interval, can be obtained by dividing the image size W·H by the number N of the runs. A square root is for making a dimension on a right side into that of a length, and (½) at the end is a term for setting the first dilation amount D1 to half the run interval (see FIG. 7B).

Further, a proportionality constant a is a correction coefficient taking into account an average length, a distribution and the like of the runs, and can be empirically obtained in advance.

Further, as a method for directly reflecting the average length L of the runs on the first dilation amount D1, it is considered to use the following equation:

$$D1 = \beta (W \cdot H/N)^{1/2}/(2L) \qquad \text{(Equation 2)}.$$

If it is temporally possible to calculate the average length L of the runs from given image data, a better result can be obtained by using this (Equation 2) than by using (Equation 1). Note that a proportionality constant β is a correction coefficient taking into account the distribution of the runs, and can be empirically obtained in advance.

Further, if there is a sufficient processing time, it is also considered to obtain the proportionality constant β in (Equation 2) based on the image contents as needed. For example, it is considered to calculate the variance of center of gravity of each run in each of the X direction and Y direction in the image and use a value obtained by dividing a product of those by the pixel number as the proportionality constant β.

As described above, in performing a processing of dilating an object in an image using a given target dilation amount, the image processing of this embodiment is configured as follows. If the target dilation amount is larger than the first dilation amount determined according to a density of run data in the run-length represented image, the dilation processing in the first stage using the relatively small first dilation amount is performed. Thereafter, the second dilation processing is performed to finally dilate the object by the target dilation amount. The first dilation amount is set to such a value as to integrate as many runs, preferably all the runs, on the same line in the image.

By integrating many runs on one line in this way, the number of combinations of the runs, for which the contact determination should be made, is reduced in the second dilation processing. In this way, a processing speed can be improved by suppressing a calculation processing amount.

Note that the invention is not limited to the above embodiment and various changes other than the aforementioned ones can be made without departing from the gist of the invention. For example, in the above embodiment, the first dilation amount determined according to the contents of the image, specifically, the density of the runs in the image, and the target dilation amount are compared. If the target dilation amount is larger, the dilation processing is first performed using the first dilation amount, rather than performing the dilation processing directly using the target dilation amount. However, accuracy based on the principle may be required, rather than the processing time, for example, depending on the purpose. To deal with such a purpose, a mode for performing the dilation processing using the target dilation amount even if the target dilation amount is larger than the first dilation amount may be further provided in addition to the processing mode as described above. If the mode is switched, for example, according to an instruction operation input by a user, the user can select and perform the mode corresponding to the purpose.

Further, in the above embodiment, a lower limit value and an upper limit value of the first dilation amount D1 are not particularly limited. However, depending on a condition of run distribution in the image, the value of the first dilation amount D1 obtained by calculation may be extremely small or large and, as a result, not suitable as a threshold value in dividing the dilation processing. To avoid this, at least one of the lower and upper limit values may be set in advance for the first dilation amount D1 and, if a calculation result falls below the lower limit value or exceeds the upper limit value, the calculation result may be rounded to the lower or upper limit value.

Further, for a similar reason, a threshold value may be fixedly set for at least one of the target dilation amount and the number of the runs, and the two-stage dilation processing may be performed only when these values exceed the threshold values. As described above, whether or not the speed-up of the processing by the two-stage dilation processing is effective depends on a necessary dilation amount and the density of the runs in the image. Thus, in this embodiment, the first dilation amount D1 determined according to the run density and the target dilation amount Dt are compared.

However, if the target dilation amount and the run density are sufficiently small, it is predictable that the calculation processing amount does not become very large. In such a case, the two-stage dilation processing is not necessarily required. That is, if the target dilation amount and/or the run density is/are smaller than the predetermined threshold value(s), the dilation processing may be directly performed using the target dilation amount Dt without waiting for judgment by comparison to the first dilation amount D1. In other words, the two-stage dilation processing may be performed only when the target dilation amount and/or the run density exceed(s) the predetermined threshold value(s).

Further, for example, various image processings in the above embodiment can be performed using a computer device having a general hardware configuration. That is, this computer device can be caused to function as an execution body of the invention by recording a computer program describing the above operation procedure in a recording medium and implementing this computer program in a general-purpose computer device.

As the specific embodiment has been illustrated and described above, the first dilation amount can be determined based on the number of the pixels constituting the binary image and at least one of the number and lengths of the runs in the image processing method according to the invention. How much an effect of speeding-up the processing by dividing the dilation processing into two stages is obtained depends on the density of the runs in the image to be processed. Therefore, by obtaining the first dilation amount using these values serving as indices of the run density, the effect can be made more reliable.

More specifically, the first dilation amount can be, for example, determined to be proportional to a square root of a ratio of the number of the pixels and the number of the runs. Further, for example, the first dilation amount can be determined to be proportional to a square root of a ratio of the number of the pixels and the number of the runs and inversely proportional to an average length of the runs. According to the knowledge of the inventors of this application, the effect of speeding up the dilation processing can be obtained by calculating the first dilation amount using a calculation formula based on such a way of thinking.

In these cases, the calculation formula for calculating the first dilation amount may include a proportionality constant determined according to a distribution of the runs in the binary image. Even if the run density in the entire image is the same, the effect of the processing is thought to be different when the runs are uniformly distributed and when the runs are nonuniformly distributed. From this, the proportionality constant for reflecting the condition of run distribution on the processing may be used. Such a proportionality constant can be, for example, empirically determined using various sample images in advance.

Further, for example, a mode for performing the dilation processing of directly dilating an object by the target dilation amount may be selectable in response to an instruction from a user even if the target dilation amount is larger than the first dilation amount. Depending on the purpose of the processing, the image contents or the like, it may be better to perform the dilation processing directly using the target dilation amount even if the target dilation amount is large. This is, for example, a case where the speeding-up effect of the processing by the invention is not necessary. If the mode is made switchable by a user instruction, the modes can be used properly according to the purpose.

Further, in the invention, each run in the binary image may be represented by the run data including information representing a starting point coordinate and an end point coordinate of the run. Various encoding methods for the run-length representation of a binary image have been proposed. If the run data in which the starting point coordinate and the end point coordinate of each run are clear is used in those methods, the presence or absence of contact between the lines, which are not the same lines, can be easily judged.

This invention can be applied to image processings in general using a binary image. This invention can be, for example, particularly suitably applied for the purpose of detecting defects of industrial products and analyzing microscope images of cells and the like.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An image processing method for dilating an object in a binary image represented by run-length code, the image processing method comprising:
    obtaining a target dilation amount representing how much the object is to be dilated;
    determining a first dilation amount which has a smaller value as a density of runs in the binary image increases;
    comparing the target dilation amount and the first dilation amount;
    when the target dilation amount is larger than the first dilation amount based on the comparison, i) performing a first dilation processing of dilating the object by the first dilation amount and ii) performing a second dilation processing of dilating the object after the first dilation processing by a second dilation amount, the second dilation amount being a difference between the target dilation amount and the first dilation amount; and
    when the target dilation amount is equal to or smaller than the first dilation amount based on the comparison, performing a third dilation processing of directly dilating the object by the target dilation amount.

2. The image processing method according to claim 1, wherein the first dilation amount is determined based on a number of pixels constituting the binary image and at least one of a number and lengths of the runs.

3. The image processing method according to claim 2, wherein the first dilation amount is determined to be proportional to a square root of a ratio of the number of the pixels and a number of the runs.

4. The image processing method according to claim 2, wherein the first dilation amount is determined to be proportional to a square root of a ratio of the number of the pixels and a number of the runs and inversely proportional to an average length of the runs.

5. The image processing method according to claim 3, wherein a calculation formula for calculating the first dilation amount includes a proportionality constant determined according to a distribution of the runs in the binary image.

6. The image processing method according to claim 4, wherein a calculation formula for calculating the first dilation amount includes a proportionality constant determined according to a distribution of the runs in the binary image.

7. The image processing method according to claim 1, wherein even if the target dilation amount is larger than the first dilation amount, a mode for performing the third dilation processing of directly dilating the object by the target dilation amount is also selectable in response to an instruction from a user.

8. The image processing method according to claim 1, wherein each run in the binary image is represented by run data including information representing a starting point coordinate and an end point coordinate of the run.

9. A computer-readable recording medium, storing non-transitorily a computer program causing a computer device to perform each processing of the image processing method according to claim 1.

* * * * *